United States Patent
Harms (10) Patent No.: US 10,390,494 B2
(45) Date of Patent: Aug. 27, 2019

(54) HYDROPONIC ELECTROCULTURE SYSTEM AND METHODS OF USE

(71) Applicant: Aermist LLC, Las Vegas, NV (US)

(72) Inventor: Jonathan S. Harms, Las Vegas, NV (US)

(73) Assignee: Nano Evaporative Technologies, Inc., Las Vegas, NV (US)

( * ) Notice: Subject to any disclaimer, the term of this patent is extended or adjusted under 35 U.S.C. 154(b) by 482 days.

(21) Appl. No.: 15/002,378

(22) Filed: Jan. 20, 2016

(65) Prior Publication Data

US 2017/0202156 A1 Jul. 20, 2017

(51) Int. Cl.
*A01G 7/04* (2006.01)
*A01G 31/02* (2006.01)
(Continued)

(52) U.S. Cl.
CPC .............. *A01G 7/04* (2013.01); *A01G 24/00* (2018.02); *A01G 31/02* (2013.01); *C25B 1/04* (2013.01);
(Continued)

(58) Field of Classification Search
CPC .......... A01G 7/04; A01G 31/00; A01G 31/02; A01G 31/06; C25B 1/04; C25B 1/02;
(Continued)

(56) References Cited

U.S. PATENT DOCUMENTS

| 4,320,594 A | * | 3/1982 | Raymond | .............. C12M 21/02 |
| | | | | 47/1.4 |
| 4,496,443 A | * | 1/1985 | Mack | ....................... C05D 5/00 |
| | | | | 119/51.5 |

(Continued)

FOREIGN PATENT DOCUMENTS

| DE | 10016591 A1 * | 10/2000 | .............. C25B 1/04 |
| JP | 01116090 A * | 5/1989 | |

(Continued)

OTHER PUBLICATIONS

Machine translation for JP 1-116090 (Year: 1989).*
DE 10016591 Machine translation (Year: 2000).*

*Primary Examiner* — Son T Nguyen
(74) *Attorney, Agent, or Firm* — Entralta P.C.; Justin G. Sanders; Peter D. Weinstein (57) ABSTRACT

A hydroponic electroculture system is disclosed for use in a hydroponic growing environment. In at least one embodiment, an at least one electroculture unit is positioned in fluid communication with the hydroponic growing environment and provides a conductive core comprising an absorbing layer sandwiched between a pair of opposing first and second conductive layers; each of the first and second conductive layers being in electrical communication with an at least one electrical wire. With the absorbing layer saturated with the fluid of the hydroponic growing environment, an electrical current is selectively delivered to each of the first and second conductive layers which, in turn, forms a reaction within the absorbing layer that causes an off-gassing of oxygen and hydrogen in the form of bubbles to be delivered, along with the electrical current in the fluid, to the roots of an at least one plant in the hydroponic growing environment.

8 Claims, 6 Drawing Sheets

(51) Int. Cl.
*C25B 1/04* (2006.01)
*C25B 9/06* (2006.01)
*A01G 24/00* (2018.01)
*C25B 15/08* (2006.01)
*A01G 31/00* (2018.01)
*A01G 24/35* (2018.01)

(52) U.S. Cl.
CPC ............... *C25B 9/06* (2013.01); *C25B 15/08* (2013.01); *A01G 24/35* (2018.02); *A01G 2031/006* (2013.01); *Y02E 60/366* (2013.01); *Y02P 60/216* (2015.11)

(58) Field of Classification Search
CPC .... C25B 9/06; C25B 9/08; C25B 1/05; C25B 1/06; C02F 1/461
USPC ....... 47/59 R, 62 R, 62 A, 62 C, 62 E, 62 N; 204/278.5, 252
See application file for complete search history.

(56) References Cited

U.S. PATENT DOCUMENTS

| | | | | |
|---|---|---|---|---|
| 4,678,554 | A * | 7/1987 | Oppitz | A01G 7/04 204/290.11 |
| 5,056,260 | A * | 10/1991 | Sutton | A01G 7/00 47/58.1 R |
| 2007/0108065 | A1* | 5/2007 | Roiner | C25B 1/00 205/628 |
| 2008/0283412 | A1* | 11/2008 | Giddey | C25B 1/04 205/350 |
| 2009/0152118 | A1* | 6/2009 | Sugimasa | C25B 1/06 205/80 |
| 2010/0051450 | A1* | 3/2010 | Murahara | A01G 31/00 204/240 |
| 2012/0324789 | A1* | 12/2012 | Pease | A01G 31/00 47/62 N |
| 2013/0112550 | A1* | 5/2013 | Marsh | C02F 1/461 204/258 |
| 2013/0255152 | A1* | 10/2013 | Johnson | A01G 31/02 47/62 C |
| 2014/0026481 | A1* | 1/2014 | Podmajersky | A62C 5/02 47/62 N |
| 2014/0259920 | A1* | 9/2014 | Wilson | A01G 31/02 47/62 R |
| 2014/0346046 | A1* | 11/2014 | Andelman | C02F 1/4691 204/554 |
| 2016/0262324 | A1* | 9/2016 | Yamane | A01G 31/06 |
| 2017/0029296 | A1* | 2/2017 | Xiao | C02F 1/467 |
| 2017/0037522 | A1* | 2/2017 | Kaczur | C25B 1/00 |
| 2017/0084928 | A1* | 3/2017 | Kneule | H01M 8/004 |
| 2017/0174538 | A1* | 6/2017 | Lelah | C02F 1/4618 |
| 2017/0191172 | A1* | 7/2017 | Nagate | C25B 11/02 |
| 2017/0314143 | A1* | 11/2017 | Emerick | C25B 1/02 |
| 2017/0321329 | A1* | 11/2017 | Spurgeon | C25B 1/02 |
| 2017/0321331 | A1* | 11/2017 | Mitsushima | C25B 3/04 |
| 2017/0350021 | A1* | 12/2017 | Kawabata | C25B 1/02 |
| 2018/0291514 | A1* | 10/2018 | Lumetta | C25B 15/08 |

FOREIGN PATENT DOCUMENTS

| | | | |
|---|---|---|---|
| JP | 01187037 | A * | 7/1989 |
| JP | 2006296388 | A * | 11/2006 |
| JP | 2006325493 | A * | 12/2006 |

* cited by examiner

HYDROPONIC ELECTROCULTURE SYSTEM AND METHODS OF USE

RELATED APPLICATIONS

Not applicable.

BACKGROUND

The subject of this patent application relates generally to electroculture, and more particularly to a hydroponic electroculture system and associated methods of use.

Applicant(s) hereby incorporate herein by reference any and all patents and published patent applications cited or referred to in this application.

By way of background, plants are sensitive to many different forms of stimuli. Not only are plants responsive to various environmental conditions—such as temperature, light quality, light direction and moisture, for example—but they are also responsive to other lesser known forms of stimuli—such as electricity and magnetism. The term "electroculture" refers to a group of techniques that uses electricity and magnetism to amplify and focus magnetic and natural electric forces of nature to boost soil fertility, and plant growth. Improved plant growth, quality and increased yields, are some of the noticeable effects of electroculture. The technology can also be used to protect plants from pests and diseases.

By way of further background, hydroponics is a branch of agriculture where plants are grown without the use of soil. The nutrients that the plants normally derive from the soil are simply dissolved into water instead; and depending on the type of hydroponic system used, the plant's roots are suspended in, flooded with or misted with the nutrient solution so that the plant can derive the elements it needs for growth. As the population of our planet soars and arable land available for crop production declines, hydroponics allows for the production of crops in greenhouses or other buildings and non-soil-based locations that may be adapted to support agriculture. Accordingly, hydroponics offers the ability to grow food in places where traditional agriculture simply isn't possible. Areas that don't receive consistent sunlight or warm weather can also benefit from hydroponics—such as with a hydroponic greenhouse, where light and temperature can be controlled to produce higher crop yields. Additionally, on average, hydroponic systems tend to only require roughly twenty percent (20%) of the amount of land, and roughly ten percent (10%) of the amount of water, typically required for soil-based crop growth.

Traditionally, electroculture techniques have been used in soil-based agricultural contexts. Thus, there remains a need for an electroculture system, and associated methods of use, adapted for use in hydroponic-based agricultural contexts.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a hydroponic electroculture system for use in a hydroponic growing environment having an at least one container configured for supporting an at least one plant such that the roots of said plant are able to extend down into a volume of fluid positioned within the container, along with an at least one supply line, return line and pump configured for circulating the fluid through the container. In at least one embodiment, an at least one electroculture unit is positioned in fluid communication with at least one of the at least one container, supply line, return line and pump. The at least one electroculture unit provides a conductive core comprising an absorbing layer capable of being saturated with the fluid and having a first surface and an opposing second surface. A first conductive layer is attached to the first surface of the absorbing layer. A second conductive layer is attached to the second surface of the absorbing layer, such that the absorbing layer is substantially sandwiched between the first and second conductive layers and the first conductive layer is spaced apart from the second conductive layer. An at least one first electrical wire is in electrical communication with the first conductive layer. An at least one second electrical wire is in electrical communication with the second conductive layer. With the absorbing layer saturated with the fluid, an electrical current is selectively delivered to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container. As a result, the at least one electroculture unit assists the at least one plant in developing a relatively more robust root system, increasing greater yields, repelling pests, increasing disease resistance, and producing relatively more female plants.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
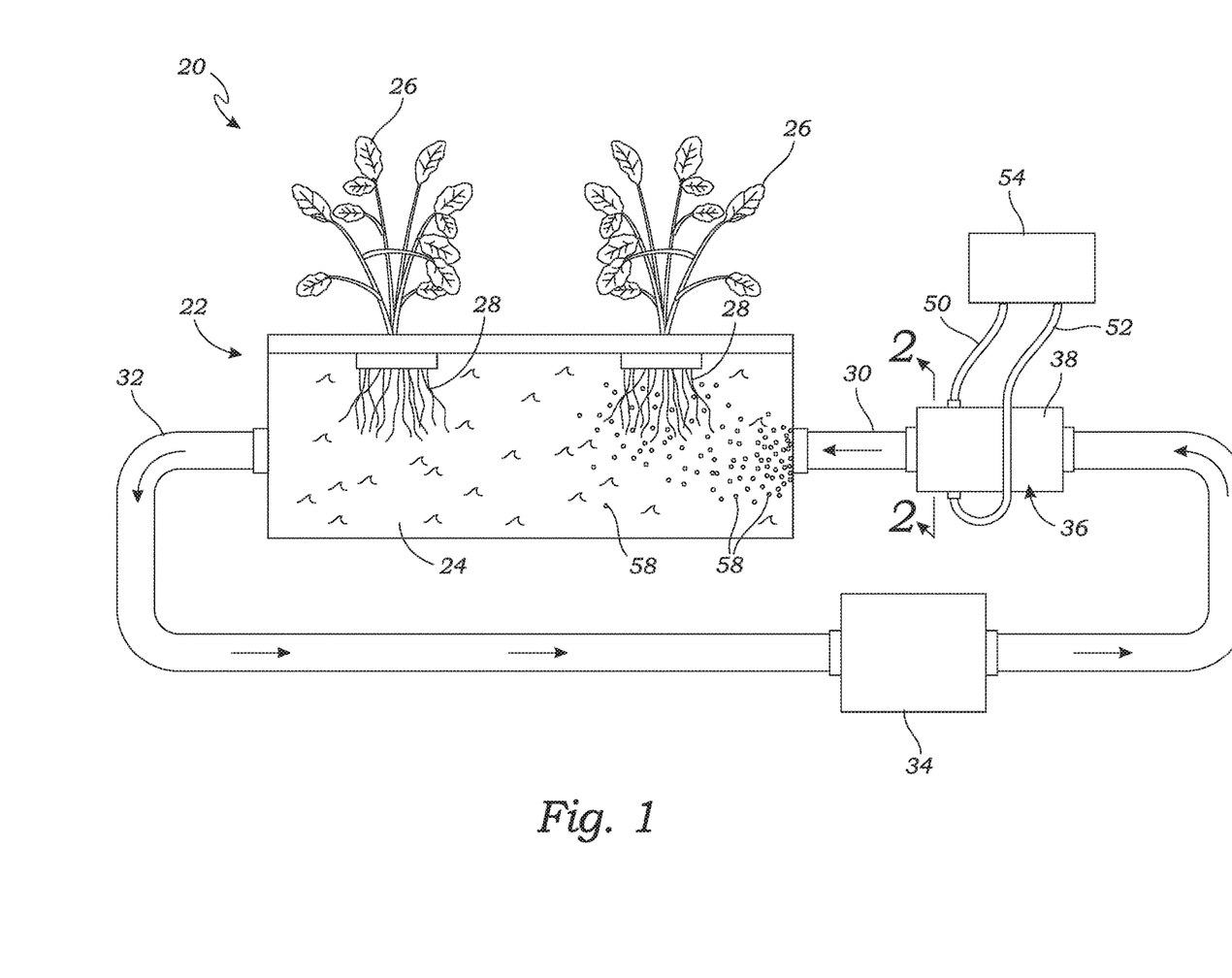
FIG. 1 is a simplified schematic view of an exemplary hydroponic electroculture system, in accordance with at least one embodiment.

Turning now to FIG. 1, there is shown a simplified schematic view of an exemplary hydroponic electroculture system 20, in accordance with at least one embodiment. In at least one embodiment, the system 20 provides an at least one container 22 sized and configured for containing a volume of fluid 24. In at least one such embodiment, the at least one container 22 is further configured for supporting an at least one plant 26 such that the roots 28 of the at least one plant 26 are able to extend down into the fluid 24 positioned within the container 22. The at least one container 22 is in fluid communication with an at least one supply line 30, configured for delivering the fluid 24 into the container 22, and an at least one return line 32, configured for removing the fluid 24 from the container 22. Additionally, each of the at least one supply line 30 and return line 32 are in fluid communication with an at least one pump 34 configured for moving the fluid therethrough. Accordingly, in at least one embodiment, the at least one supply line 30, return line 32 and pump 34 cooperate to circulate the fluid 24 through the container 22. In at least one embodiment, not shown, an at least one reservoir may also be in fluid communication with the at least one supply line 30, return line 32 and pump 34, and configured for storing a volume of the fluid 24 to be circulated through the at least one container 22. Additionally, in at least one embodiment, not shown, an at least one filter may also be in fluid communication with the at least one supply line 30, return line 32 and pump 34, and configured for filtering out any unwanted particulates from the fluid 24 as the fluid 24 is circulated through the system 20. It should be noted that the term "fluid" is intended to include any liquid, solution or combination thereof—now known or later developed—capable of being utilized in a hydroponic growing context. Thus, while certain types of fluids—such as water, for example—might be expressly mentioned herein for illustrative purposes, the present invention should not be read as being so limited. It should also be noted that while the container 22 is shown in the drawings as being substantially rectangular in shape, in further embodiments, the container 22 may take on any other size, shape and/or dimensions now known or later conceived—dependent, at least in part, on the number and types of plants 26 to be supported by the container 22. Additionally, while only a single container 22 is shown in the drawings for illustrative purposes, in further embodiments, any number of containers 22 (having the same or varying sizes, shapes and/or dimensions) may be incorporated into the system 20, interconnected either in series or parallel via the at least one supply line 30 and return line 32.

With continued reference to FIG. 1, in at least one embodiment, the system 20 further provides an at least one electroculture unit 36 positioned in fluid communication with at least one of the at least one container 22, supply line 30, return line 32 and pump 34. In at least one such embodiment, as illustrated best in the cross-sectional view of FIG. 2, the at least one electroculture unit 36 provides a housing 38 that defines a passageway 39 through which the fluid 24 may flow. An at least one absorbing layer 40, having a first surface 42 and an opposing second surface 44, is positioned within the housing 38. Additionally, a first conductive layer 46 is attached to the first surface 42 of the absorbing layer 40, and a second conductive layer 48 is attached to the second surface 44 of the absorbing layer 40, such that the absorbing layer 40 is substantially sandwiched between the first and second conductive layers 46 and 48, and the first and second conductive layers 46 and 48 are held in a substantially parallel and spaced apart position relative to one another. Accordingly, in at least one embodiment, the first and second conductive layers 46 and 48, along with the absorbing layer 40 sandwiched therebetween, form a conductive core 49 positioned within the housing 38. In at least one embodiment, the absorbing layer 40 is constructed out of an absorbent material, such as microfiber, capable of being saturated with the fluid 24. However, in further embodiments, the absorbing layer 40 may be constructed out of any other material (or combination of materials) now known or later developed—such as cloth, cotton, paper wadding, cellulose fiber, or superabsorbent polymers, for example—so long as said materials are capable of allowing the absorbing layer 40 to substantially carry out the functionality described herein. In at least one embodiment, the first and second conductive layers 46 and 48 are constructed out of a material (or combination of materials) capable of functioning as an electrical conductor—such as stainless steel, platinum or copper, for example. Additionally, in at least one embodiment, the first and second conductive layers 46 and 48 are liquid permeable, allowing the fluid 24 to flow therethrough and into the absorbing layer 40. In at least one such embodiment, each of the first and second conductive layers 46 and 48 is constructed of a material (or combination of materials) having a plurality of apertures, such as mesh or some other porous structure. In at least one further such embodiment, each of the first and second conductive layers 46 and 48 is constructed of a liquid permeable material (or combination of materials). In still further embodiments, the first and second conductive layers 46 and 48 may be constructed out of any other material (or combination of materials), and may take on any other shape, size, dimensions or configurations, now known or later developed, so long as the first and second conductive layers 46 and 48 are capable of substantially carrying out the functionality described herein.

Figure 2:
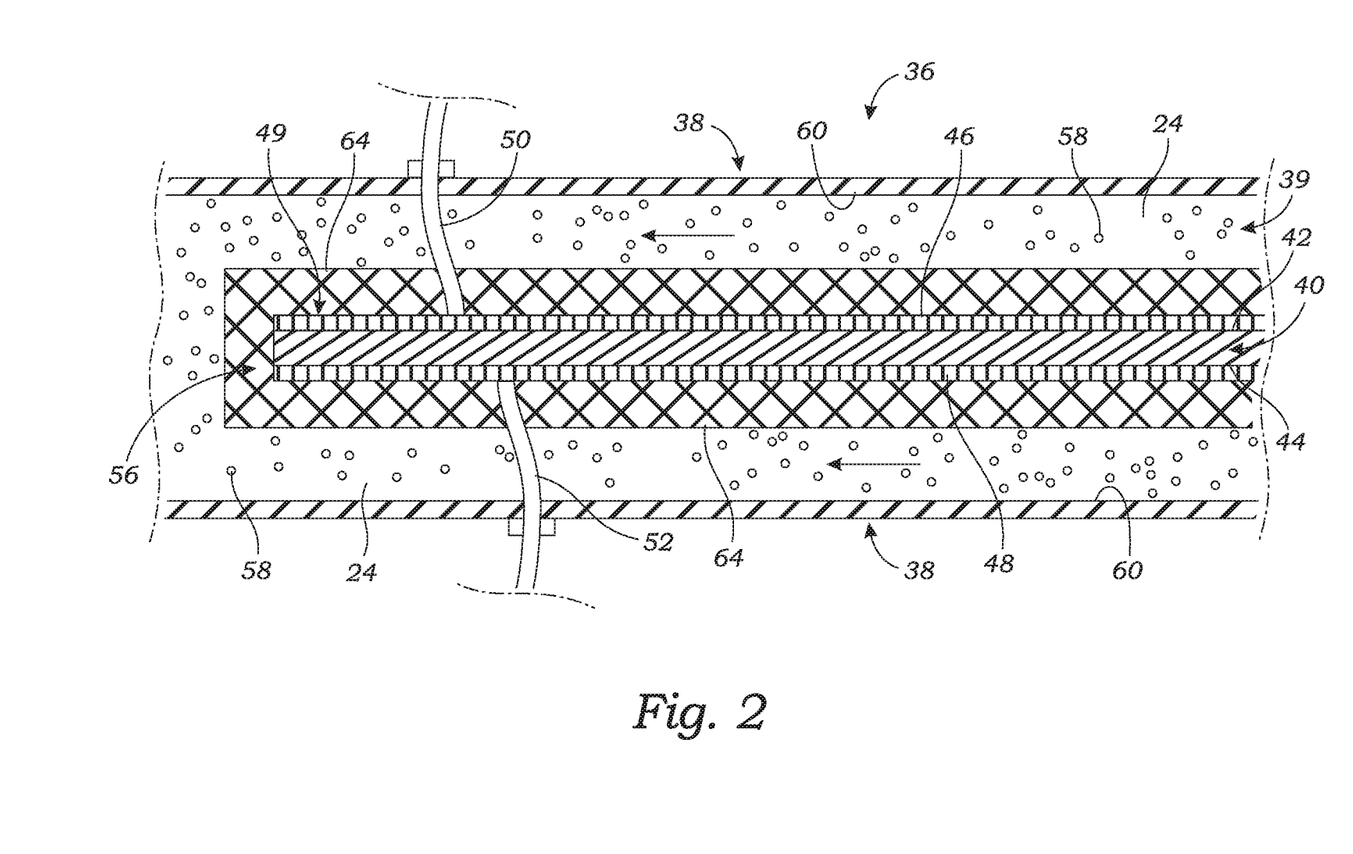
FIG. 2 is a partial cross-sectional view of an exemplary electroculture unit of the system, taken along line 2-2 of FIG. 1, in accordance with at least one embodiment.

With continued reference to FIGS. 1 and 2, in at least one embodiment, the first conductive layer 46 is in electrical communication with an at least one first electrical wire 50, and the second conductive layer 48 is in electrical communication with an at least one second electrical wire 52. Additionally, each of the at least one first electrical wire 50 and second electrical wire 52 is connected to an at least one generator 54, thereby allowing an electrical current to be selectively delivered to the first and second conductive layers 46 and 48, respectively. It should be noted that the term "wire" is intended to include any structure, material or combinations of materials capable of being interconnected between the generator 54 and one of the at least one first and second conductive layers 46 and 48 for allowing an electrical current to pass therebetween. Additionally, the term "generator" is intended to include any electrical power source, or combination of power sources, capable of generating an electrical current. In at least one such embodiment, where the system 20 is used in a hydroponic growing environment that utilizes ultraviolet grow lights, the generator 54 may be configured to capture and be selectively powered by solar energy from the grow lights.

With continued reference to FIG. 2, in at least one embodiment, the conductive core 49—i.e., the first and second conductive layers 46 and 48 along with the absorbing layer 40 sandwiched therebetween—is substantially encapsulated within an at least one porous layer 56. In at least one such embodiment, the porous layer 56 is constructed of a gypsum-ceramic casting. In a bit more detail, in one such embodiment, the gypsum-ceramic casting consists of two parts gypsum to one part ceramic material formed from heated and expanded sand, providing a material of optimal weight and efficiency for casting. The resulting ceramic matrix is a lightweight castable material, providing strength as well as weight savings. This same optimal mixture ratio also provides a casting material that can sufficiently bond to the first and second conductive layers 46 and 48 along with the absorbing layer 40. Thus, the gypsum-ceramic casting may be formed to closely conform to the first and second conductive layers 46 and 48 along with the absorbing layer 40. Additionally, this gypsum-ceramic casting provides an internal structure that permits a faster migration of fluid through the porous layer 56, as well as the capability to retain more fluid 24 when fully saturated, the importance of which is discussed further below. In at least one such embodiment, an internal structure of the casting contains foamed ceramic. In further embodiments, the porous layer 56 may be constructed out of any other material (or combination of materials) now known or later developed—such as other types of hydrophilic gypsum-based materials, terracotta, or ceramic for example—so long as said materials are capable of allowing the porous layer 56 to substantially carry out the functionality described herein.

In at least one embodiment, the porous layer 56 includes anti-microbial material for better preventing mold, bacteria or viruses from developing. In one such embodiment, the anti-microbial material comprises zinc powder. In another such embodiment, the anti-microbial material comprises silver. In still further embodiments, the anti-microbial material may comprise any other material or combination of materials, now known or later developed, having such anti-microbial properties. In an at least one further embodiment, not shown, the porous layer 56 provides an at least one anti-microbial plate—constructed of zinc metal or the like—positioned within the porous layer 56 such that the fluid 24 passes over the anti-microbial plate as it moves through the porous layer 56. In at least one such embodiment, the anti-microbial plate is configured for being selectively removable so as to be replaced as it erodes over time. In a still further such embodiment, where the porous layer 56 is constructed of a gypsum-ceramic casting, the anti-microbial material is mixed into the gypsum-ceramic casting. In at least one alternate embodiment, the fluid 24 itself contains anti-microbial additives.

Referring again to FIG. 1, in at least one embodiment, with the at least one electroculture unit 36 so positioned within the system 20 and the absorbing layer 40 saturated with the fluid 24, an electrical current may be selectively applied to each of the first and second conductive layers 46 and 48 which, in turn, forms a reaction between the first and second conductive layers 46 and 48—within the now conductive absorbing layer 40—that causes an off-gassing of oxygen and hydrogen (where the fluid 24 consists at least partially of water) in the form of a plurality of bubbles 58 which move through the system 20 and ultimately reach the roots 28 of the at least one plant 26 within the at least one container 22. In at least one embodiment, depending on the materials with which the first and second conductive layers 46 and 48 are constructed, copper ions may also be released into the fluid 24 as a byproduct of the reaction. Additionally, given that the at least one electroculture unit 36 is in fluid communication with at least one of the at least one container 22, supply line 30, return line 32 and pump 34, the electrical current will travel throughout the fluid 24 it is in contact with, meaning that the roots 28 of the at least one plant 26 will also receive the electrical current. As a result of the increased amounts of oxygen and hydrogen, along with the electrical current, being delivered to the roots 28, the at least one electroculture unit 36 assists the at least one plant 26 in developing a relatively more robust system of roots 28 that will ultimately result in greater yields. The delivery of electrical current by the at least one electroculture unit 36 also assists in repelling pests from the at least one plant 26 and can also increase disease resistance, in addition to producing relatively more female plants 26. In at least one embodiment, the generator 54 provides a relatively low voltage DC current, on the order of approximately 5-24 volts. However, in further embodiments, the generator 54 may provide any other voltage amount—in the form of either AC or DC current—to the first and second conductive layers 46 and 48 that may be deemed appropriate, dependent at least in part on the size of the system 20 as well as the number and types of plants 26 being grown.

Figure 3:
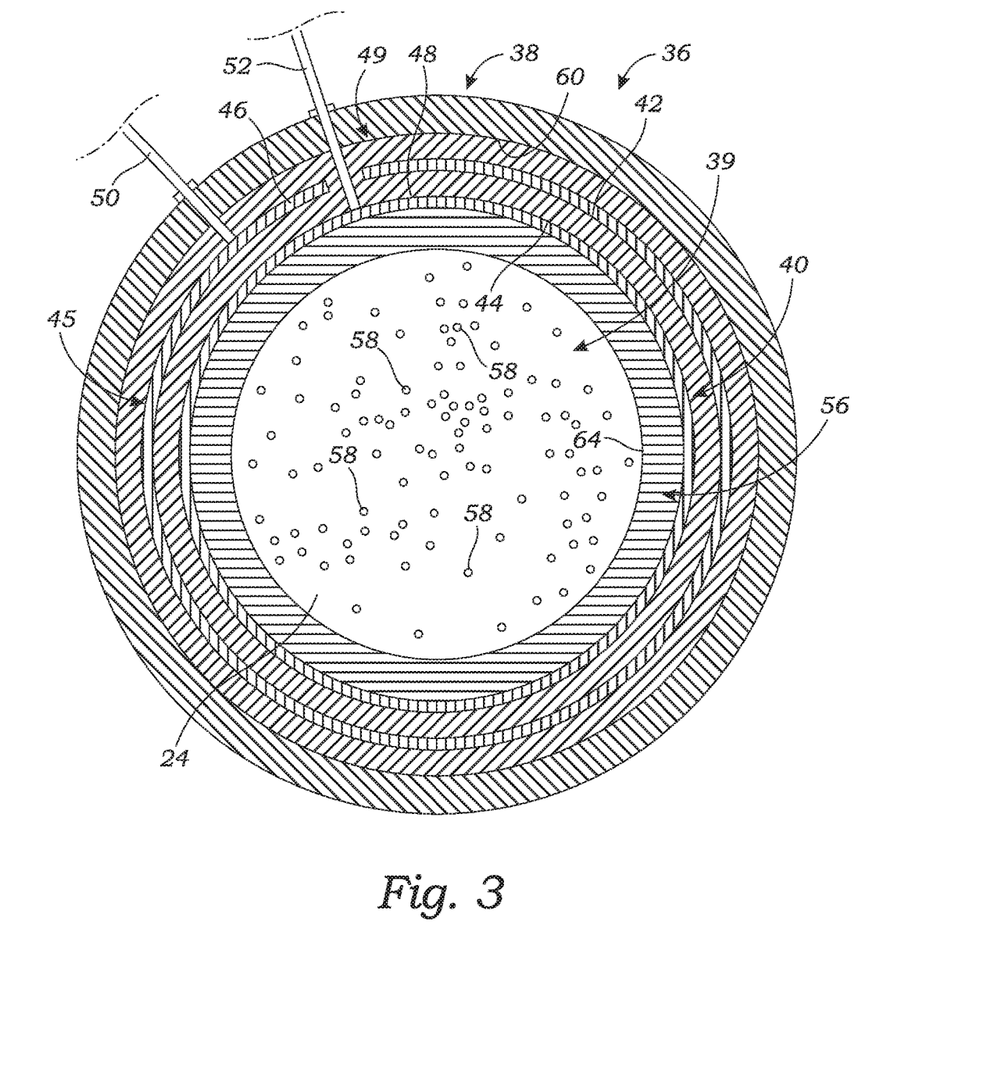
FIG. 3 is a partial cross-sectional view of a further exemplary embodiment of the electroculture unit, in accordance with at least one embodiment.

In at least one alternate embodiment, as illustrated in the cross-sectional view of FIG. 3, the conductive core 49—i.e., the first and second conductive layers 46 and 48 along with the absorbing layer 40—is formed immediately adjacent to, and conforms to the shape of, an inner surface 60 of the housing 38. Additionally, in at least one such embodiment, rather than substantially encapsulating the conductive core 49, the porous layer 56 is formed immediately adjacent and directly attached to an exposed inner surface of the second conductive layer 48 (thereby sandwiching the second conductive layer 48 between the porous layer 56 and the absorbing layer 40), such that the porous layer 56 defines the passageway 39 through which the fluid 24 may flow—rather than the fluid 24 flowing around the porous layer 56 as in the embodiment depicted in FIG. 2. Additionally, in at least one such embodiment, an at least one further absorbing layer 45 may be positioned between the first conductive layer 46 and the inner surface 60 of the housing 38 so as to help insulate the housing 38 from the electrical current and also provide a relatively stronger attachment between the inner surface 60 of the housing 38 and the internal components—depending at least in part on the material of which the housing 38 is constructed. Alternatively, in at least one embodiment, the first conductive layer 46 may be directly attached to the inner surface 60 of the housing 38.

In at least one further alternate embodiment, the housing 38 of the at least one electroculture unit 36 may be omitted. In such an embodiment, the electroculture unit 36—i.e., the conductive core 49 and the substantially encapsulating porous layer 56—may be positioned elsewhere in the system 20, so long as the electroculture unit 36 remains in fluid communication with at least one of the at least one container 22, supply line 30, return line 32 and pump 34. In at least one such embodiment, the at least one electroculture unit 36 may be positioned within at least one of the at least one container 22, supply line 30, return line 32 and pump 34 (along with any other components that may be integrated into the system 20). In at least one such embodiment, where the electroculture unit 36 is positioned within the at least one supply line 30 or return line 32, the supply line 30 or return line 32 itself would effectively function as a structural substitute for the housing 38 shown in FIGS. 2, 3 and 6. In still further such embodiments, the porous layer 56 may also be omitted.

Figure 4:
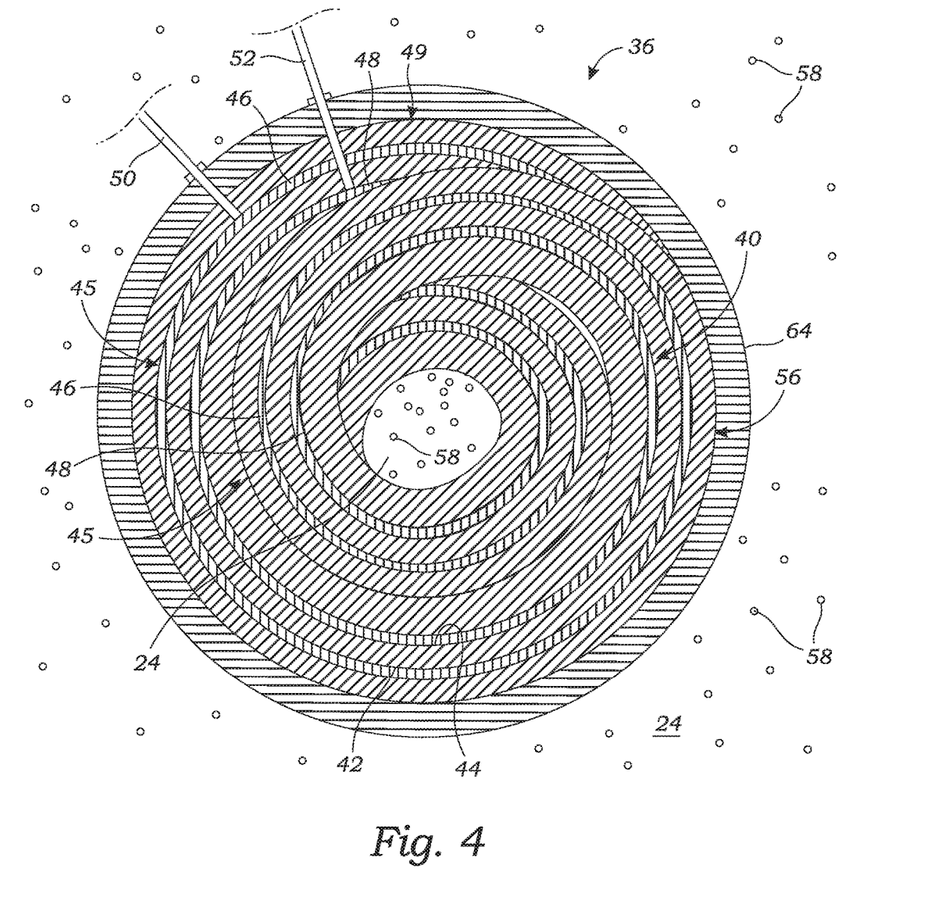
FIG. 4 is a partial cross-sectional view of a still further exemplary embodiment of the electroculture unit, in accordance with at least one embodiment.

In at least one still further alternate embodiment, as illustrated in the partial cross-sectional view of FIG. 4, with the absorbing layer 40 sandwiched between the first and second conductive layers 46 and 48, the conductive core 49 provides a pair of further absorbing layers 45 formed immediately adjacent and directly attached to an outer surface of the first conductive layer 46 and the inner surface of the second conductive layer 48, respectively. As such, each of the first and second conductive layers 46 and 48 is respectively sandwiched between the absorbing layer 40 and the further absorbing layers 45. Additionally, in at least one such embodiment, the conductive core 49 is rolled up or otherwise folded against itself in a relatively compact fashion, thereby increasing the number of conductive layers positioned in a spaced-apart (by virtue of the absorbing layer 40 and the further absorbing layers 45), side-by-side, alternating arrangement—though technically still only comprising the first and second conductive layers 46 and 48—which, in turn, increases the amount of oxygen and hydrogen that is off-gassed by the electroculture unit 36 when an electrical current is selectively applied to each of the first and second conductive layers 46 and 48 as described above. Furthermore, in at least one embodiment, with the conductive core 49 rolled up or otherwise folded against itself in a relatively compact fashion, the electroculture unit 36 is able to produce increased amounts of oxygen and hydrogen without requiring additional space for the conductive core 49 itself. Similar to the other embodiments described herein, in at least one such embodiment, the conductive core 49 is substantially encapsulated by the porous layer 56; however, in at least one such alternate embodiment, the porous layer 56 is omitted.

Figure 5:
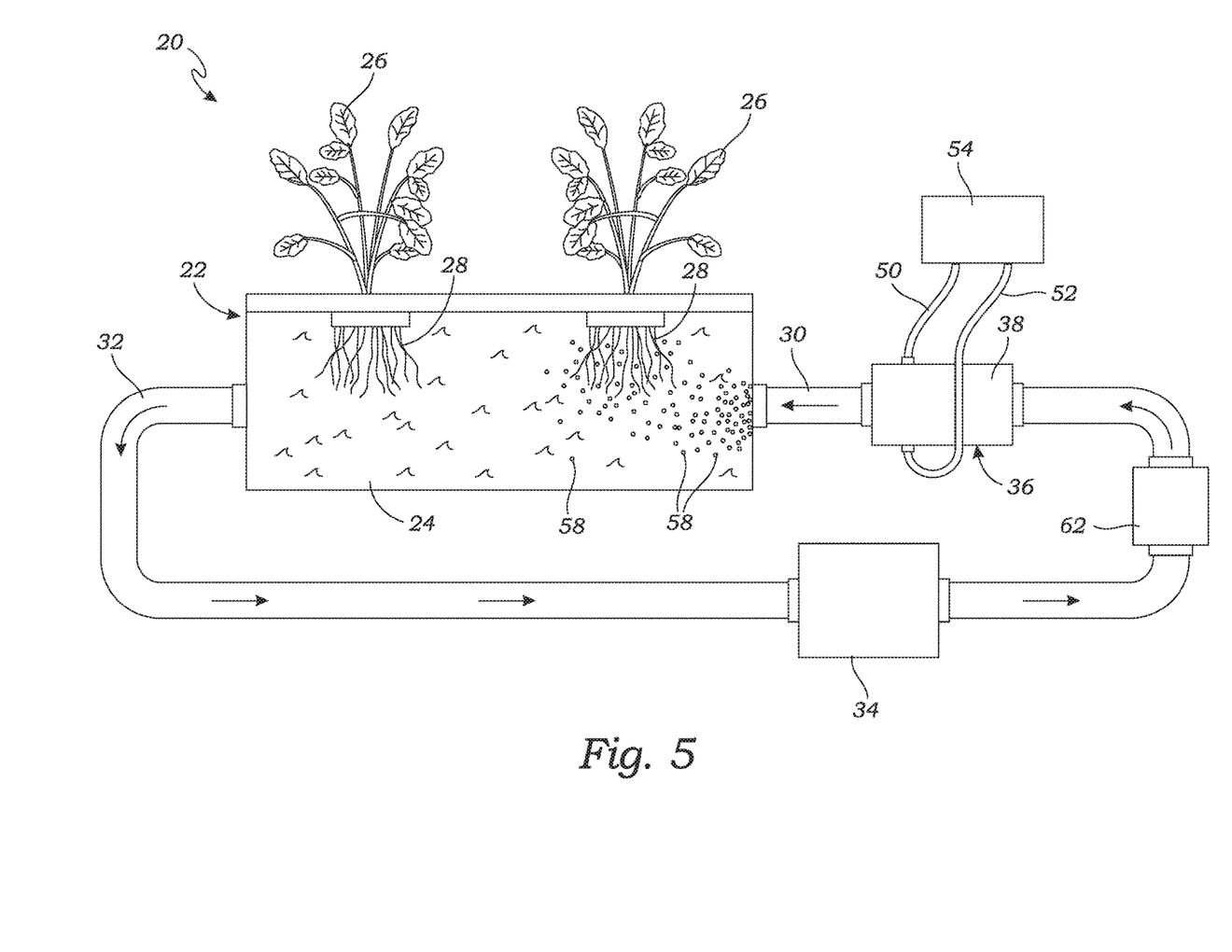
FIG. 5 is a simplified schematic view of a further exemplary hydroponic electroculture system, in accordance with at least one embodiment.
Figure 6:
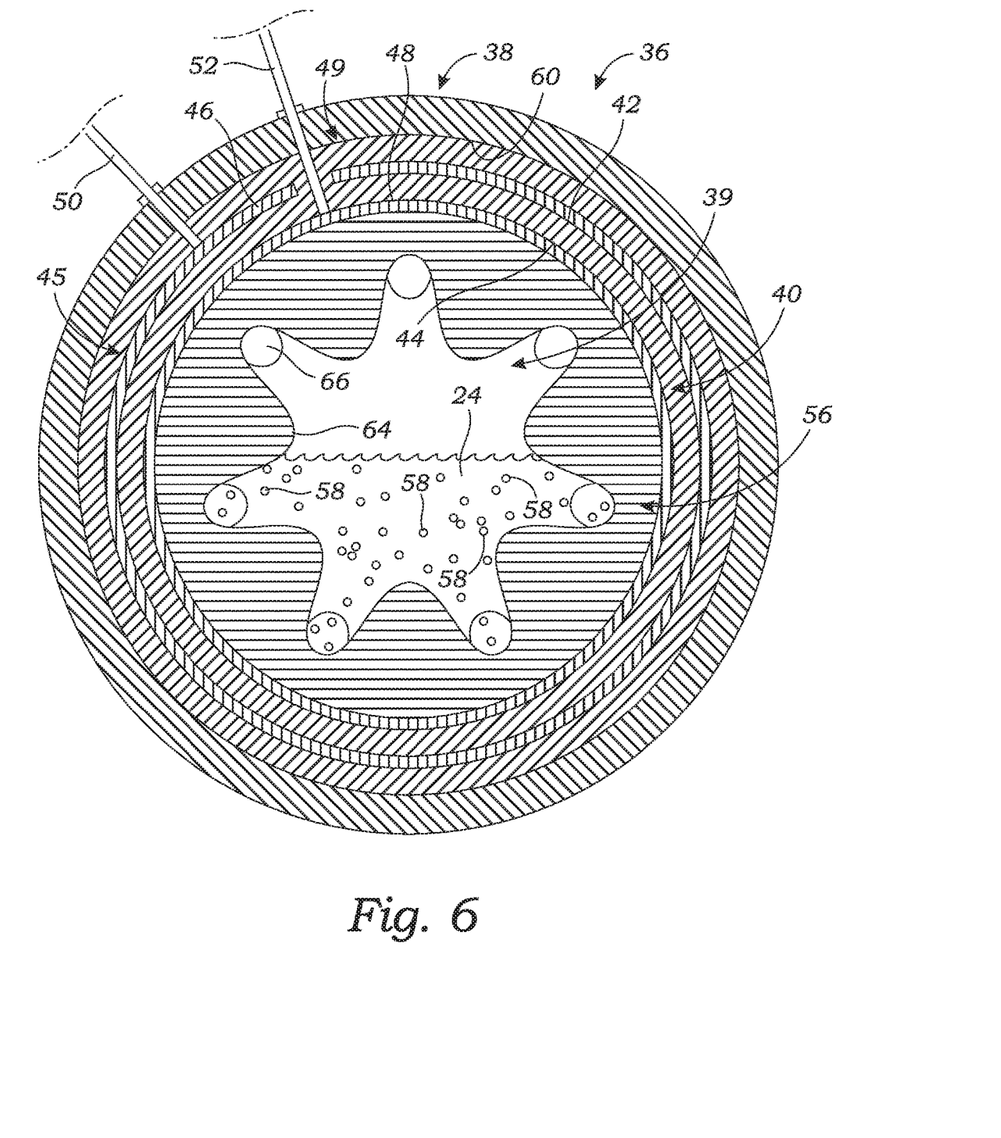
FIG. 6 is a partial cross-sectional view of a still further exemplary embodiment of the electroculture unit, in accordance with at least one embodiment.

In at least one embodiment, as illustrated in FIGS. 5 and 6, in contexts where regulation of the temperature of the fluid 24 is desired, the system 20 may further provide an at least one booster unit 62 in fluid communication with at least one of the at least one container 22, supply line 30, return line 32, pump 34 and electroculture unit 36; the at least one booster unit 62 being configured for assisting in appropriately modifying the temperature of the fluid 24 before it enters the at least one container 22. In contexts where the fluid 24 must be relatively colder than the surrounding environment, the at least one booster unit 62 is configured for assisting in appropriately cooling the fluid 24. In contexts where the fluid 24 must be relatively warmer than the surrounding environment, the at least one booster unit 62 is configured for assisting in appropriately warming the fluid 24. In at least one embodiment, where the fluid 24 must be relatively colder than the surrounding environment, the passageway 39 of the electroculture unit 36 is sized and configured for allowing both the fluid 24 as well as a volume of air to pass therethrough, as illustrated in the cross-sectional view of FIG. 6. Additionally, in at least one such embodiment, the at least one booster unit 62 is a fan positioned and configured for moving the air through the electroculture unit 36. In such an embodiment, the portion of the electroculture unit 36 in contact with the fluid 24 is capable of generating additional oxygen and hydrogen in the fluid 24 via the electrical current, as described above, while the portion of the electroculture unit 36 that is exposed to the air is capable of cooling the air—and, in turn, the fluid 24—as the fluid 24 within the porous layer 56 evaporates into the air moving across the porous layer 56. In at least one further such embodiment, the at least one booster unit 62 is an air cooling unit, thereby being capable of both cooling the air and moving the air through the electroculture unit 36. In at least one embodiment, the at least one air cooling unit is an evaporative HVAC apparatus such as described in at least U.S. Patent Application Publication Nos. 2014/0208796, 2015/0123294 and 2015/0362201, the contents of which are hereby incorporated herein by reference. In still further embodiments, the at least one booster unit 62 may be any other type of device (or combination of devices)—now known or later developed—capable of assisting in appropriately modifying the temperature of the fluid 24 before it enters the at least one container 22.

With continued reference to FIG. 6, in at least one such alternate embodiment, an exposed first surface 64 of the porous layer 56 is convoluted so as to maximize the surface area of the porous layer 56. The greater the surface area of the porous layer 56, over which air is able to pass, the greater effect the porous layer 56 has on the temperature of the air passing through the electroculture unit 36. The convoluted first surface 64 also facilitates in the rapid tumbling of the air that passes through the passageway 39 of the electroculture unit 36, thereby assisting to provide an even distribution of air temperature by the porous layer 56. In one such embodiment, as illustrated best in FIG. 6, the first surface 64 of the porous layer 56 provides a plurality of finger-like protrusions 66 extending inwardly within the passageway 39 of the electroculture unit 36. However, it should be noted that the particular configuration of the first surface 64 shown in the accompanying drawing figures is merely exemplary and should not be read as limiting in any way. Accordingly, in further embodiments, the first surface 64 may take on any other size, shape, dimensions, or configurations now known or later conceived, so long as the porous layer 56 is capable of substantially carrying out the functionality described herein.

Aspects of the present specification may also be described as follows:

1. A hydroponic electroculture system for use in a hydroponic growing environment having an at least one container configured for supporting an at least one plant such that the roots of said plant are able to extend down into a volume of fluid positioned within the container, along with an at least one supply line, return line and pump configured for circulating the fluid through the container, the hydroponic electroculture system comprising: an at least one electroculture unit positioned in fluid communication with at least one of the at least one container, supply line, return line and pump, the at least one electroculture unit comprising: a conductive core comprising: an absorbing layer capable of being saturated with the fluid and having a first surface and an opposing second surface; a first conductive layer attached to the first surface of the absorbing layer; and a second conductive layer attached to the second surface of the absorbing layer, such that the absorbing layer is substantially sandwiched between the first and second conductive layers and the first conductive layer is spaced apart from the second conductive layer; an at least one first electrical wire in electrical communication with the first conductive layer; and an at least one second electrical wire in electrical communication with the second conductive layer; whereby, with the absorbing layer saturated with the fluid, an electrical current is selectively delivered to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container.

2. The hydroponic electroculture system according to embodiment 1, wherein the absorbing layer is constructed out of a microfiber material.

3. The hydroponic electroculture system according to embodiments 1-2, wherein the first and second conductive layers are constructed out of a material capable of functioning as an electrical conductor.

4. The hydroponic electroculture system according to embodiments 1-3, wherein each of the first and second conductive layers are liquid permeable, allowing the fluid to flow therethrough and into the absorbing layer.

5. The hydroponic electroculture system according to embodiments 1-4, wherein each of the first and second conductive layers is constructed of a material having a plurality of apertures, allowing the fluid to flow therethrough and into the absorbing layer.

6. The hydroponic electroculture system according to embodiments 1-5, wherein the at least one electroculture unit further comprises a porous layer substantially encapsulating the conductive core.

7. The hydroponic electroculture system according to embodiments 1-6, wherein the conductive core further comprises a pair of further absorbing layers formed immediately adjacent and directly attached to an outer surface of the first conductive layer and an inner surface of the second conductive layer, respectively, thereby sandwiching each of the first and second conductive layers between the absorbing layer and the respective further absorbing layer.

8. The hydroponic electroculture system according to embodiments 1-7, wherein the conductive core is rolled up or otherwise folded against itself, thereby allowing the first and second conductive layers to be positioned in a spaced-apart, side-by-side, alternating arrangement.

9. The hydroponic electroculture system according to embodiments 1-8, wherein the porous layer is constructed of a gypsum-ceramic casting.

10. The hydroponic electroculture system according to embodiments 1-9, wherein the gypsum-ceramic casting consists of two parts gypsum to one part ceramic material formed from heated and expanded sand.

11. The hydroponic electroculture system according to embodiments 1-10, wherein the ceramic material is foamed ceramic.

12. The hydroponic electroculture system according to embodiments 1-11, wherein the porous layer includes anti-microbial material for better preventing mold, bacteria or viruses from developing.

13. The hydroponic electroculture system according to embodiments 1-12, wherein the anti-microbial material comprises at least one of zinc and silver.

14. The hydroponic electroculture system according to embodiments 1-13, wherein the at least one electroculture unit further comprises an at least one generator in electrical communication with each of the at least one first electrical wire and second electrical wire and configured for selectively delivering an electrical current to the first and second conductive layers, respectively.

15. The hydroponic electroculture system according to embodiments 1-14, wherein the electrical current delivered by the generator is a relatively low voltage DC current, on the order of approximately 5-24 volts.

16. The hydroponic electroculture system according to embodiments 1-15, wherein the at least one electroculture unit further comprises a housing sized and configured for enclosing the conductive core while also allowing the fluid to flow therethrough.

17. The hydroponic electroculture system according to embodiments 1-16, wherein the conductive core is formed immediately adjacent to, and conforms to the shape of, an inner surface of the housing.

18. The hydroponic electroculture system according to embodiments 1-17, wherein the at least one electroculture unit further comprises a porous layer formed immediately adjacent to the second conductive layer, thereby sandwiching the second conductive layer between the absorbing layer and the porous layer.

19. The hydroponic electroculture system according to embodiments 1-18, wherein the housing is sized and configured for allowing both the fluid as well as a volume of air to pass therethrough, such that a portion of the porous layer is in contact with the fluid while a remaining portion of the porous layer is exposed to the air.

20. The hydroponic electroculture system according to embodiments 1-19, further comprising an at least one booster unit in fluid communication with at least one of the at least one container, electroculture unit, supply line, return line and pump; the at least one booster unit being configured for assisting in appropriately modifying the temperature of the fluid before it enters the at least one container.

21. The hydroponic electroculture system according to embodiments 1-20, wherein the at least one booster unit is a fan positioned and configured for moving the air through the housing of the electroculture unit.

22. The hydroponic electroculture system according to embodiments 1-21, wherein an exposed first surface of the porous layer is convoluted so as to maximize the surface area of the porous layer.

23. The hydroponic electroculture system according to embodiments 1-22, wherein the first surface of the porous layer provides a plurality of finger-like protrusions extending inwardly within the electroculture unit.

24. A hydroponic electroculture system comprising: an at least one container configured for supporting an at least one plant such that the roots of said plant are able to extend down into a volume of fluid positioned within the container; an at least one supply line in fluid communication with the at least one container and configured for delivering the fluid into the container; an at least one return line in fluid communication with the at least one container and configured for removing the fluid from the container; an at least one pump in fluid communication with the at least one supply line and return line, the at least one pump configured for circulating the fluid through the container using the at least one supply line and return line; and an at least one electroculture unit positioned in fluid communication with at least one of the at least one container, supply line, return line and pump, the at least one electroculture unit comprising: a conductive core comprising: an absorbing layer capable of being saturated with the fluid and having a first surface and an opposing second surface; a first conductive layer attached to the first surface of the absorbing layer; and a second conductive layer attached to the second surface of the absorbing layer, such that the absorbing layer is substantially sandwiched between the first and second conductive layers and the first conductive layer is spaced apart from the second conductive layer; an at least one first electrical wire in electrical communication with the first conductive layer; and an at least one second electrical wire in electrical communication with the second conductive layer; whereby, with the absorbing layer saturated with the fluid, an electrical current is selectively delivered to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container.

25. A hydroponic electroculture system for use in a hydroponic growing environment having an at least one container configured for supporting an at least one plant such that the roots of said plant are able to extend down into a volume of fluid positioned within the container, along with an at least one supply line, return line and pump configured for circulating the fluid through the container, the hydroponic electroculture system comprising: an at least one electroculture unit positioned in fluid communication with at least one of the at least one container, supply line, return line and pump, the at least one electroculture unit comprising: a housing having an inner surface that defines a substantially tubular-shaped passage extending through the housing for the fluid to flow therethrough; a conductive core positioned within the housing and comprising: a first conductive layer formed adjacent to at least a portion of the inner surface of the housing; an absorbing layer capable of being saturated with the fluid and having a first surface and an opposing second surface, first surface attached to the first conductive layer; a second conductive layer attached to the second surface of the absorbing layer, such that the absorbing layer is substantially sandwiched between the first and second conductive layers and the first conductive layer is spaced apart from the second conductive layer; and each of the first and second conductive layers being liquid permeable, allowing the fluid to flow therethrough and into the absorbing layer; an at least one first electrical wire in electrical communication with the first conductive layer; and an at least one second electrical wire in electrical communication with the second conductive layer; whereby, with the absorbing layer saturated with the fluid, an electrical current is selectively delivered to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container.

26. The hydroponic electroculture system according to embodiment 25, wherein the absorbing layer is constructed out of a microfiber material.

27. The hydroponic electroculture system according to embodiments 25-26, wherein the first and second conductive layers are constructed out of a material capable of functioning as an electrical conductor.

28. The hydroponic electroculture system according to embodiments 25-27, wherein each of the first and second conductive layers are liquid permeable, allowing the fluid to flow therethrough and into the absorbing layer.

29. The hydroponic electroculture system according to embodiments 25-28, wherein each of the first and second conductive layers is constructed of a material having a plurality of apertures, allowing the fluid to flow therethrough and into the absorbing layer.

30. The hydroponic electroculture system according to embodiments 25-29, wherein the conductive core further comprises a pair of further absorbing layers formed immediately adjacent and directly attached to an outer surface of the first conductive layer and an inner surface of the second conductive layer, respectively, thereby sandwiching each of the first and second conductive layers between the absorbing layer and the respective further absorbing layer.

31. The hydroponic electroculture system according to embodiments 25-30, wherein the conductive core is rolled up or otherwise folded against itself, thereby allowing the first and second conductive layers to be positioned in a spaced-apart, side-by-side, alternating arrangement within the housing.

32. The hydroponic electroculture system according to embodiments 25-31, wherein the at least one electroculture unit further comprises a porous layer substantially encapsulating the conductive core within the housing.

33. The hydroponic electroculture system according to embodiments 25-32, wherein the at least one electroculture unit further comprises a porous layer formed immediately adjacent to the second conductive layer, thereby sandwiching the second conductive layer between the absorbing layer and the porous layer.

34. The hydroponic electroculture system according to embodiments 25-33, wherein the porous layer is constructed of a gypsum-ceramic casting.

35. The hydroponic electroculture system according to embodiments 25-34, wherein the gypsum-ceramic casting consists of two parts gypsum to one part ceramic material formed from heated and expanded sand.

36. The hydroponic electroculture system according to embodiments 25-35, wherein the ceramic material is foamed ceramic.

37. The hydroponic electroculture system according to embodiments 25-36, wherein the porous layer includes anti-microbial material for better preventing mold, bacteria or viruses from developing.

38. The hydroponic electroculture system according to embodiments 25-37, wherein the anti-microbial material comprises at least one of zinc and silver.

39. The hydroponic electroculture system according to embodiments 25-38, wherein the at least one electroculture unit further comprises an at least one generator in electrical communication with each of the at least one first electrical wire and second electrical wire and configured for selectively delivering an electrical current to the first and second conductive layers, respectively.

40. The hydroponic electroculture system according to embodiments 25-39, wherein the electrical current delivered by the generator is a relatively low voltage DC current, on the order of approximately 5-24 volts.

41. The hydroponic electroculture system according to embodiments 25-40, wherein the conductive core is formed immediately adjacent to, and conforms to the shape of, an inner surface of the housing.

42. The hydroponic electroculture system according to embodiments 25-41, wherein the housing is sized and configured for allowing both the fluid as well as a volume of air to pass therethrough, such that a portion of the porous layer is in contact with the fluid while a remaining portion of the porous layer is exposed to the air.

43 The hydroponic electroculture system according to embodiments 25-42, further comprising an at least one booster unit in fluid communication with at least one of the at least one container, electroculture unit, supply line, return line and pump; the at least one booster unit being configured for assisting in appropriately modifying the temperature of the fluid before it enters the at least one container.

44. The hydroponic electroculture system according to embodiments 25-43, wherein the at least one booster unit is a fan positioned and configured for moving the air through the housing of the electroculture unit.

45. The hydroponic electroculture system according to embodiments 25-44, wherein an exposed first surface of the porous layer is convoluted so as to maximize the surface area of the porous layer.

46. The hydroponic electroculture system according to embodiments 25-45, wherein the first surface of the porous layer provides a plurality of finger-like protrusions extending inwardly within the electroculture unit.

In closing, regarding the exemplary embodiments of the present invention as shown and described herein, it will be appreciated that a hydroponic electroculture system and associated methods of use are disclosed. Because the principles of the invention may be practiced in a number of configurations beyond those shown and described, it is to be understood that the invention is not in any way limited by the exemplary embodiments, but is generally directed to a hydroponic electroculture system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An electroculture system for use in a hydroponic growing environment having at least one container configured for supporting at least one plant such that the roots of said plant are able to extend down into a volume of fluid positioned within the container, along with at least one supply line, return line and pump configured for circulating the fluid through the container, the electroculture system comprising:
    at least one electroculture unit positionable in fluid communication with at least one of the at least one container, supply line, return line and pump, the at least one electroculture unit comprising:
        a conductive core comprising:
            an absorbing layer capable of being saturated with the fluid and having a first surface and an opposing second surface;
            a first conductive layer attached to the first surface of the absorbing layer; and
            a second conductive layer attached to the second surface of the absorbing layer, such that the absorbing layer is sandwiched between the first and second conductive layers and the first conductive layer is spaced apart from the second conductive layer;
        a porous layer encapsulating the conductive core, the porous layer constructed of a gypsum-ceramic casting;
        at least one first electrical wire in electrical communication with the first conductive layer; and
        at least one second electrical wire in electrical communication with the second conductive layer;
    whereby, an electrical current is selectively deliverable to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container.

2. The electroculture system of claim 1, wherein the absorbing layer is constructed out of a microfiber material.

3. The electroculture system of claim 1, wherein each of the first and second conductive layers are liquid permeable, allowing the fluid to flow therethrough and into the absorbing layer.

4. The electroculture system of claim 1, wherein the porous layer includes anti-microbial material for better preventing mold, bacteria or viruses from developing.

5. The electroculture system of claim 1, wherein the at least one electroculture unit further comprises at least one generator in electrical communication with each of the at least one first electrical wire and second electrical wire and configured for selectively delivering the electrical current to the first and second conductive layers, respectively.

6. The electroculture system of claim 5, wherein the electrical current delivered by the generator is a relatively low voltage DC current, on the order of approximately 5-24 volts.

7. The electroculture system of claim 1, wherein the at least one electroculture unit further comprises a housing sized and configured for enclosing the conductive core while also allowing the fluid to flow therethrough.

8. A hydroponic electroculture system comprising:
    at least one container configured for supporting at least one plant such that the roots of said plant are able to extend down into a volume of fluid positioned within the container;
    at least one supply line in fluid communication with the at least one container and configured for delivering the fluid into the container;
    at least one return line in fluid communication with the at least one container and configured for removing the fluid from the container;
    at least one pump in fluid communication with the at least one supply line and return line, the at least one pump configured for circulating the fluid through the container using the at least one supply line and return line; and
    at least one electroculture unit positioned in fluid communication with at least one of the at least one container, supply line, return line and pump, the at least one electroculture unit comprising:
        a conductive core comprising:
            an absorbing layer capable of being saturated with the fluid and having a first surface and an opposing second surface;
            a first conductive layer attached to the first surface of the absorbing layer; and
            a second conductive layer attached to the second surface of the absorbing layer, such that the absorbing layer is sandwiched between the first and second conductive layers and the first conductive layer is spaced apart from the second conductive layer;
a porous layer encapsulating the conductive core, the porous layer constructed of a gypsum-ceramic casting;
at least one first electrical wire in electrical communication with the first conductive layer; and
at least one second electrical wire in electrical communication with the second conductive layer;
whereby, an electrical current is selectively deliverable to each of the first and second conductive layers via the at least one first electrical wire and second electrical wire, respectively, which, in turn, forms a reaction within the absorbing layer that causes an off-gassing of oxygen and hydrogen in the form of bubbles to be delivered, along with the electrical current in the fluid, to the roots of the at least one plant in the at least one container.

* * * * *